United States Patent

[11] 3,550,626

| [72] | Inventors | Robert A. Daniels<br>1103 West J-7;<br>Norman B. Foster, 1500 Kildare St.;<br>Robert P. Yeomans, 43715 N. Harwood,<br>Lancaster, Calif. 93534; John L. Cadley,<br>72 Oldfield Lane, Milford, Conn. 06460 |
|---|---|---|
| [21] | Appl. No. | 727,955 |
| [22] | Filed | May 9, 1968 |
| [45] | Patented | Dec. 29, 1970 |

[54] DOUBLE DISCONNECT DEVICE
3 Claims, 6 Drawing Figs.

[52] U.S. Cl. .................................................. 137/614.03,
285/86
[51] Int. Cl. ...................................................... F16l 29/00

[50] Field of Search ................................................ 137/614.03,
614.04; 285/82, 83, 86

[56] References Cited
UNITED STATES PATENTS

| 2,461,700 | 2/1949 | Scheiwer | 137/614.03 |
| 2,545,796 | 3/1951 | Scheiwer | 137/614.03X |
| 2,765,181 | 10/1956 | Butterfield | 137/614.03 |
| 2,843,401 | 7/1958 | Rogers | 285/82 |
| 3,131,905 | 5/1964 | Nyberg | 137/614.04X |

Primary Examiner—Robert G. Nilson
Attorney—Robert O. Richardson

ABSTRACT: A connector device for connecting fluid lines together, with minimum back pressure, and which automatically closes and seals each line upon disconnection.

PATENTED DEC 29 1970
3,550,626
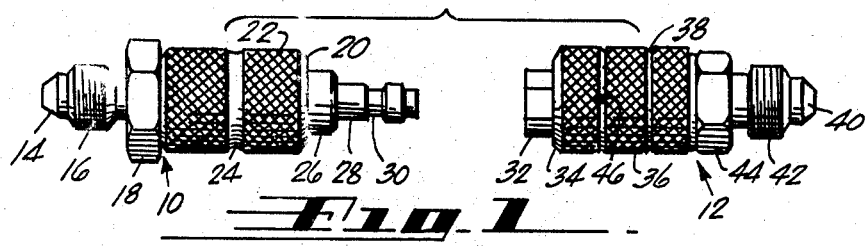
Fig. 1
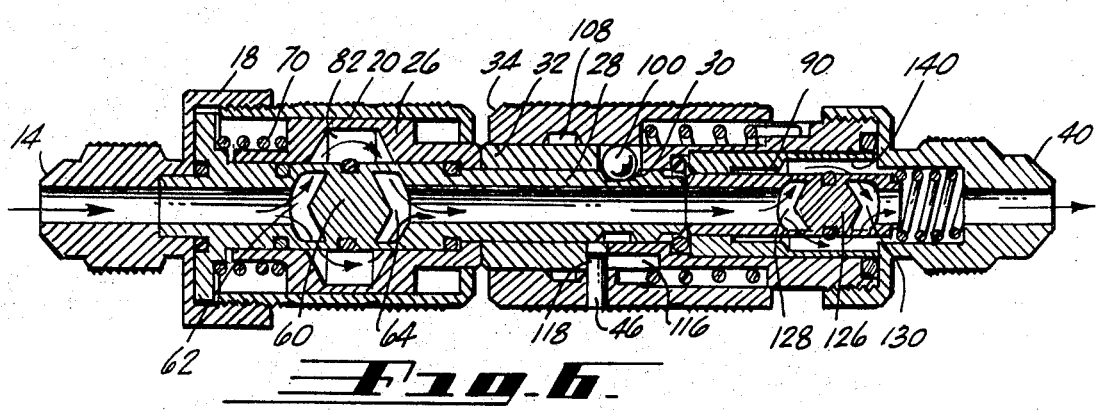
Fig. 6
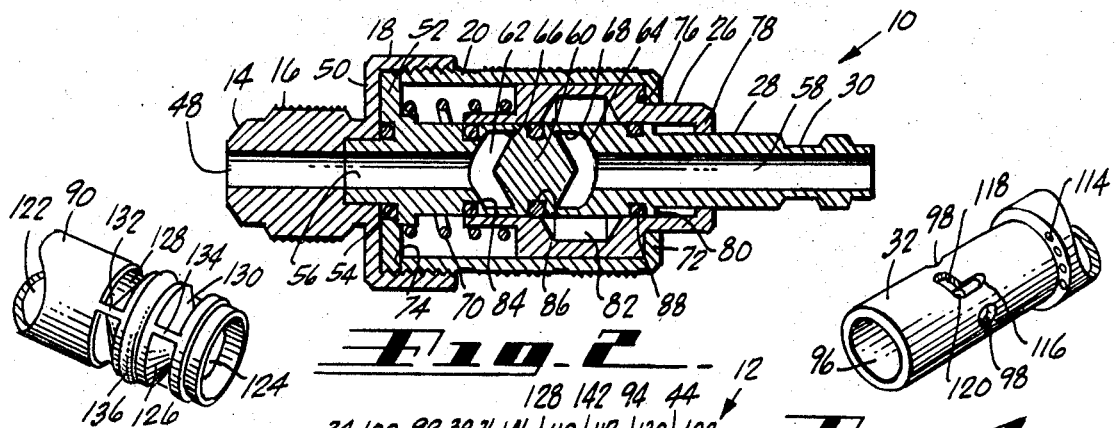
Fig. 2
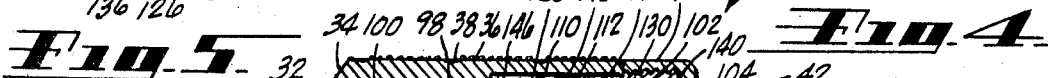
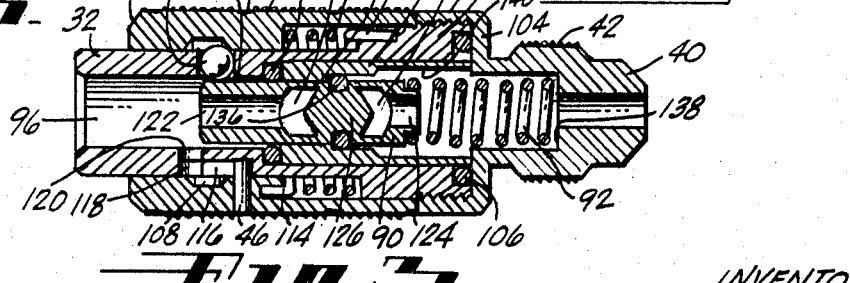
Fig. 4
Fig. 3
INVENTORS
JOHN L. CADLEY
ROBERT A. DANIELS
NORMAN B. FOSTER
ROBERT P. YEOMANS
By Robert O.
Richardson
-ATTORNEY-

DOUBLE DISCONNECT DEVICE

BACKGROUND OF INVENTION

Couples or connectors have been used for years in connecting and disconnecting pressure and flow lines. In aerospace and in underwater work it is important that the connection remains secure in an environment of bumping, pulling or vibrating. The connector must have flow characteristics such that the back pressure of the connector does not limit use of all fluids carried by the line. The connection or disconnection must be made easily and quickly, with one hand in an emergency situation. Both lines must be sealed automatically to maintain existing pressures in the lines and to prevent fluid leakage when they are disconnected.

Various connectors presently used fail to meet all of the above requirements. One with a large amount of back pressure will not permit fluid passage when the pressure is low. Another needs additional locking devices to be considered safe in an adverse environment. Another is difficult to connect and disconnect and still another seals only the pressure source line upon disconnecting, leaving the consumer line to exhaust its fluid into its environment.

SUMMARY OF THE INVENTION

The double disconnect device consists of a male member having a port for connecting to a fluid line. The fluid flow or pressure path extends from the port to the male stem through a bypass path around a central restriction. A valve has an annular groove which forms part of the bypass path when depressed by a portion of the housing of the female member to which the male member is to be connected. When disconnected, the valve is moved to block the bypass path from which the valve groove no longer is a part.

The female member has a port for connection to a fluid line. A fluid flow or pressure path extends from this port to a female housing, that fits over the male stem when connected, through a tubular valve having a central restriction with a bypass path. A valve sleeve fits over the tubular valve and has an enlarged portion forming part of the bypass path when the tubular valve is depressed by the male stem upon connection. Upon disconnection the male tubular valve moves forwardly, moving its central restriction from the enlarged portion and thus the enlarged portion from the bypass path.

Upon engagement of the male and female members, they are automatically locked and so held against inadvertent disconnection. In addition to locking balls within the female member, being engageable in recesses in the male stem, an overriding shell moves forwardly and is rotated by a torque loaded spring to override and keep the locking balls in engagement. A pin and L-shaped groove prevent accidental rearward movement of the override shell until it has been manually rotated against the torque of the torque spring and the pin in the override shell is aligned with the longitudinal leg of the L-shaped groove. The shell may then be moved rearwardly to free the locking balls from the groove in the male stem.

In one application, a 43-foot line of one-quarter inch diameter, with a 100 pound pressure source is required to permit a fluid flow of from 12 to 15 cubic feet per minute. One such use would be that of the oxygen system for an astronaut making a space walk outside his space capsule in orbit. If his assignment calls for a transfer to a second capsule, the disconnect device must seal both ends of the line where disconnected to retain oxygen in his spacesuit, and prevent oxygen from its source from spilling into space. Of course, an accidental disconnection cannot be tolerated although the desired disconnection must be easily and efficiently accomplished. Furthermore, such a disconnect device must not develop excessive back pressure as this would reduce the available oxygen supply. The back pressure of the disconnect device of the present invention is 1.9 pounds at a 13 cubic foot flow from a 100 pound source, compared to a 15 pound back pressure from devices used heretofore.

BRIEF DESCRIPTION OF THE DRAWINGS

FIG. 1 is a perspective view showing the unattached male and female connectors;

FIG. 2 is a sectional view of the male connector;

FIG. 3 is a sectional view of the female connector;

FIG. 4 is a partial perspective view of the female connector showing the L-shaped slot in the outer surface of the housing;

FIG. 5 is a partial perspective view showing the central restriction and bypass path slots of the valve in the female coupler; and FIG. 6 is a sectional view showing the connectors locked together.

Referring now to FIG. 1, there is shown a male connector 10 and a female connector 12. The male connector 10 has a port 14 with external threads 16 for making a threaded connection with a fluid line, not shown. Other types of connections may be made, as desired. A connector end with a hexagonal head 18 is integral with port 14 and has threadedly attached thereto an outer shell 20 having knurled surfaces 22 and land 24. A valve 26 fits over male stem 28 and is adapted to move axially into the outer shell 20 when the male and female connectors are engaged. Stem 28 has a retention recess 30 annularly grooved to receive a plurality of locking balls in locking the connectors together.

The female connector 12 has a housing 32 having an axial opening to receive the male stem 28. An override shell 34 moves axially over the housing 32 when connection is made to lock the locking balls, not shown in FIG. 1, within housing 32 in the retention recess 30. Shell 34 also has a knurled outer surface 36 with lands 38. Port 40 has a threaded outer surface 42 for connection with a fluid line although, of course, other types of connections may be made. This port forms an end for the female connector 12 and has a hexagonal head 44 to facilitate its installation thereto. Within the female connector, but not shown in FIG. 1, is a valve that is actuated upon insertion of stem 28 into housing 32. This valve closes upon removal of the stem to seal the female connector from leakage of fluid from the line to which it is connected. Also within the female connector is a compression torquing spring, also not shown in FIG. 1, which moves the override shell 34 axially over the end of housing 32 and also imparts a rotation as can be observed by the rotational movement of the exposed end of pin 46. This automatic rotational movement locks the shell 34 over housing 32 (and thus the locking balls in recess 30) to prevent accidental axial movement of the shell 34 and resultant disengagement of the connectors.

A cross-sectional view of the male connector 10 is shown in FIG. 2. Port 14 has an axial opening 48 therein defining a fluid path. As previously stated, the threaded surface 16 is adapted for connection with a fluid line which may be either to a fluid source or to an object using the fluid. This port has an annular collar 50 terminating in a hexagonal head 18 to which a wrench may be applied in installing the connector. A stem 28 has a collar 52 that fits within head 18 and against collar 50. A suitable O-ring 54 prevents leakage therebetween. An axial opening 56 communicates with opening 48 to continue the fluid path. Stem 28 has an axial opening 58 at the outer end thereof which is also part of the fluid path. A central restriction 60 in stem 28 blocks a direct connection between fluid paths 56 and 58. However, a plurality of milled slots 62 and 64 extend outwardly to the outer surface of the stem to provide bypass fluid paths. Legs 66 and 68 provide the necessary integrity to make the stem 28 an integral component.

Mounted over the stem 28 is a spring biased valve 26. Spring 70 is placed in compression between stem collar 52 and the valve 26 to urge the valve continually to its outermost position, as shown. An outer cylindrical shell 20 with an inturned flange 72 is threadedly attached to the port hexagonal head 18 to limit the outward movement of the valve 26. The inner end 74 of shell 20 abuts against stem collar 52 to hold stem 28 in fixed position.

Valve 26 has a shoulder 76 which abuts against shell flange 72 to limit its outward movement and an inturned flange 78 which abuts against shoulder 80 to limit its inward movement. Valve 26 has an inner annular groove 82 which, when valve 26 is moved inwardly, makes a fluid path connection between milled slots 62 and 64 as can be seen in FIG. 6. As shown in FIG. 2 the valve is moved outwardly and groove 82 does not provide this connection between the fluid paths and the male connector is shut off. Valve 26 is moved inwardly to open position by housing 32 of the female connector when the male and female connectors are joined. O-rings 84, 86 and 88 in annular grooves in stem 28 prevent leakage between the stem 28 and valve 26.

The female connector 12 portion of the double disconnect device is shown in cross section in FIG. 3. It consists of a housing 32, override shell 34, port 40 with threaded outer surface 42 and hexagonal head 44, valve 90 with compression spring 92 and valve sleeve 94. Housing 32 has an axial opening 96 therein to receive the male stem 28 of the male connector 10. Housing 32 has a plurality of apertures 98 therein to receive locking balls 100 which move radially outwardly in unlocked position as shown and inwardly to locked position within groove 30 of male stem 28 as will be explained more fully hereinafter. The inner end 102 of housing 32 threadedly engages the inner wall of hexagonal head 44 and abuts the inner surface of end portion 104 of port 40. O-ring 106 provides a fluidtight seal.

Override shell 34 has an annular groove 108 therein to receive locking balls 100 as shown. A compression spring 110 with torque is fitted between housing 32, with one end 112 of the spring embedded in opening 114 (shown in FIG. 4) and the override shell 34. Spring end 114 fits within a similar opening in the shell. This spring 110 imparts a tendency on shell 34 at all times to move outwardly over the outer end of housing 32 and also rotate. This rotation causes the override shell 34 to remain in this outer locked position even when an accidental axial force is applied. Only when a counterrotation is first applied and then a force along the axis will the shell move back to the position shown and locking balls 100 engage groove 108 to retain it thus. The sequence of movement of the shell 34 is regulated by the L-shaped groove, with axial leg 116 and transverse leg 118 on the outer surface of housing 32, which is engaged by pin 46 extending inwardly from shell 34. An aperture 120 permits pin 46 to be pushed inwardly to remove it from shell 34 to permit disassembly and removal of shell 34 when desired.

The female valve fluid sealing portion consists of valve sleeve 94, valve plug 90 and compression spring 92. Plug 90 is similar to stem 28 in FIG. 2 in that it has a pair of axial fluid paths 122, 124 with a central restriction 126 preventing fluid flow directly between them. Radially directed milled slots 128, 130 extend to the outer surface of plug 90 with legs 132 and 134 making the plug an integral component. An O-ring 136 is placed around restriction 126 for sealing. A perspective view of this arrangement is shown in FIG. 5.

Spring 92 seats over the end of plug 90 having fluid path 124 and abuts against a recessed inner surface 138 of port 40. Valve sleeve 94 fits over valve plug 90 and abuts against the inner surface of end portion 104. This sleeve has an inner portion 140 having a larger diameter than that of restriction 126 in order to complete the fluid path between slots 128 and 130 when the plug 90 has been moved inwardly and the restriction 126 is in alignment with inner portion 140. When this occurs, due to stem 28 of the male connector 10 protruding against the valve plug end in making a connection the locking balls 100 move inwardly (due to the tapered side of groove 108 and the outward spring bias on the override shell 34). The balls 100 drop into stem groove 30 and the override shell 34 moves forwardly, over the end of housing 32 and rotates the length of transverse slot 118 therein.

Plug sleeve 94 has an outermost end portion 142 of a diameter to permit axial movement of plug 90 therethrough. O-ring 136 on plug 90 seats against lip 144 formed within the sleeve 94 to make a fluid tight seal. O-ring 146 also forms a fluidtight seal between the outer end of sleeve 94 and housing 32.

After the sleeve 94 has been positioned over plug 90 the housing 32 is threaded into the hexagonal head 44 and spring 110 positioned over it with end 112 inserted into opening 114. Override shell 34 is then inserted over housing 32 and rotated until spring end 114 finds its associated opening in the shell. Thereafter valve plug 90 is depressed to permit locking balls 100 to move inwardly and thus permit further depression of the override shell until groove 108 is aligned with the balls. Thereafter the valve plug is released and it assumes the position shown in FIG. 3. Shell 34 is then rotated until its opening for pin 46 is in alignment with groove leg 116 and the pin is inserted. Assembly is then complete.

FIG. 6 shows in cross section the male and female connectors locked in position for fluid passage. This connection is initiated by inserting stem 28 into housing 32 to depress valve plug 90. When this occurs locking balls 100 move inwardly into groove 30 and override shell 34 moves toward the end of housing 32 to lock the balls in the groove. Override shell 34 also rotates to the degree limited by pin 46 in transverse groove 118. Valve plug 90 has been depressed enough that center restriction 126 is aligned with portion 140 of valve sleeve 94 having the enlarged diameter. In this position the fluid path is open and follows the arrows as shown. Housing 32 also abuts valve 26 to move it rearwardly, aligning groove 82 over central restriction 60. Here groove 82 completes the fluid path through the male connector as shown by the arrows.

It is to be noted that in the female connector it is the valve plug 90 that is moved to open position by the male stem 28 and that in the male connector valve 26 is moved to open position by female housing 32. The groove 82, increased diameter 140 and slots 62, 64, 128 and 130 are of such size compared to the size of the openings in ports 14 and 40 that back pressure is kept to a minimum.

Disengagement of the connectors is accomplished by first counterrotating the override shell 34 until pin 46 is aligned with axial groove 116 and then depressing the shell from over the housing 32. This permits the locking balls 100 to move outwardly into groove 108, unlocking the two connectors. When the stem 28 is removed from housing 32 the valve plug 90 moves outwardly, engaging O-ring 136 with seat 144 and sealing the female connector from fluid leakage. When the male connector is removed, valve 26 moves outwardly to move groove 82 out of alignment with slots 62. O-ring 86 provides a fluid tight seal for the male connector when disconnected.

Having thus described a preferred embodiment of the present invention it is to be understood that modifications and variations will be obvious to those skilled in the art and that these deviations from the illustrated embodiment are to be considered as part of the present invention as set forth in the appended claims.

We claim:

1. A double disconnect device for connecting fluid transmission lines comprising:
    a male connector adapted to be connected to one line and a female connector adapted to be connected to the other line;
    said connectors being adapted to be interconnected to permit transmission of fluid therethrough;
    each of said connectors having means therein operable to seal said connectors against fluid flow therefrom when said connectors are not interconnected and operable to permit fluid flow therethrough when interconnected;
    said male connector having a stem with a locking groove near the end thereof;
    said female connector having a housing to receive said stem, said housing having locking means therein adapted to fit within said locking groove;
    an override shell on said female connector having a groove in the inner wall thereof to receive said locking means therein;

means responsive to insertion of said stem into said housing to release said shell for movement thereof to move said locking means into said locking groove;

said override shell having biased means exerting compression and torque thereon to urge longitudinal and rotational movement thereof;

said housing having an L-shaped groove on the outer surface thereof; and said shell having a guide pin adapted to fit and move within said L-shaped groove upon longitudinal and rotational movement of said shell.

2. A double disconnect device for connecting fluid transmission lines comprising:

a male connector adapted to be connected to one line and a female connector adapted to be connected to the other line;

said connectors being adapted to be interconnected to permit transmission of fluid therethrough;

each of said connectors having means therein operable to seal said connectors against fluid flow therefrom when said connectors are not interconnected and operable to permit fluid flow therethrough when interconnected;

said male connector having a central fluid restriction with radially extending fluid paths therearound;

a cylindrical valve slidably movable over said restriction, said valve having a groove on its inner wall which, when positioned over said restriction, completes the fluid path around said restriction, said valve obstructing fluid flow past said restriction when moved to a position where said groove is not positioned over said restriction; and said female connector having means thereon to move said valve to position said groove over said restriction.

3. A double disconnect device as in claim 2:

said female connector having a valve with a central restriction with radially extending fluid paths therearound;

a valve sleeve around said valve and having an enlarged bore at one end thereof, and a reduced bore at the other end thereof; and said valve being movable upon interconnection of said connectors.